Patented Nov. 7, 1933

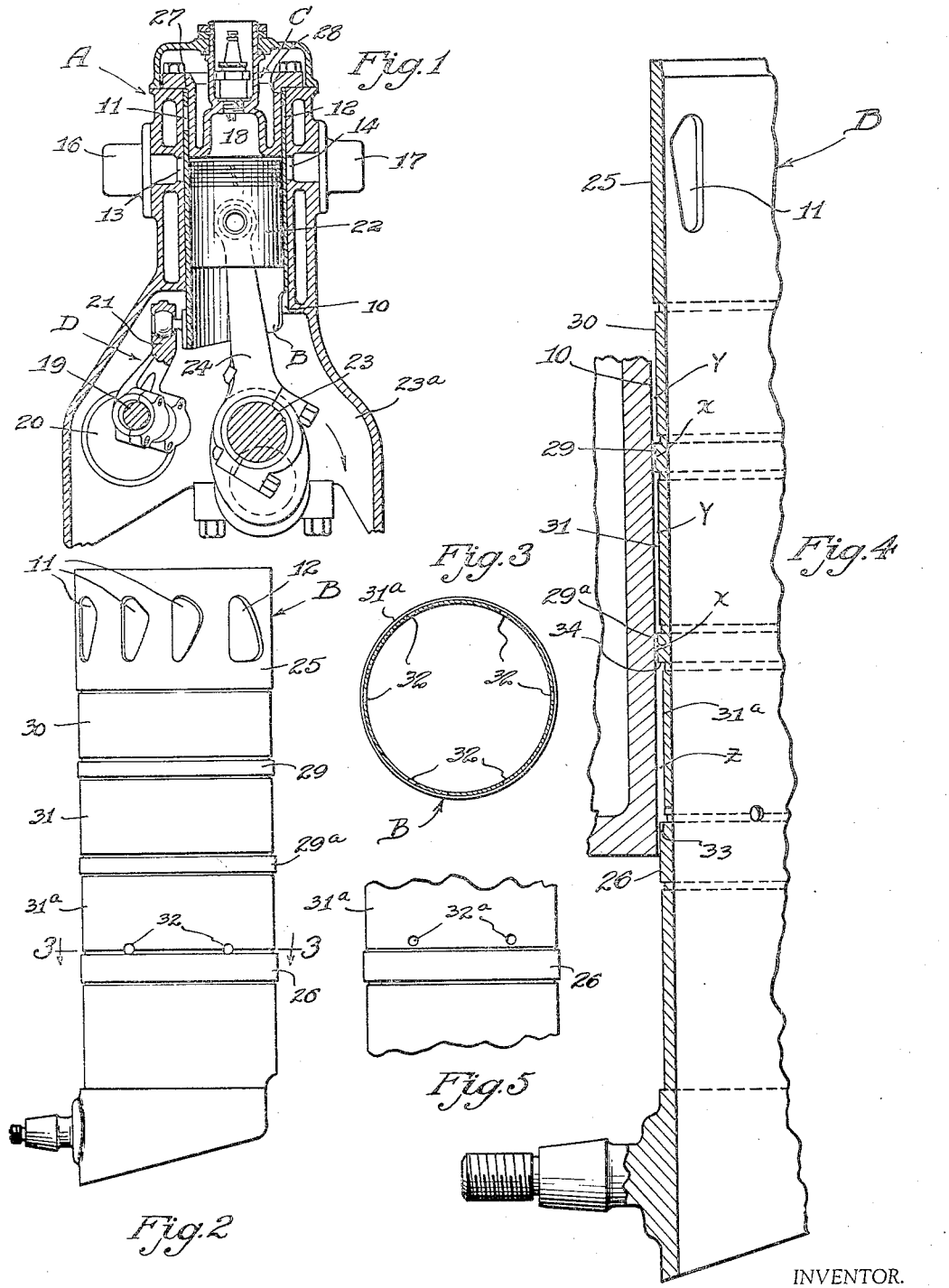

1,933,912

UNITED STATES PATENT OFFICE 1,933,912

ENGINE

Lewis P. Kalb, Grosse Pointe, Mich., assignor to Continental Motors Corporation, Detroit, Mich., a corporation of Virginia Application March 3, 1932. Serial No. 596,416

30 Claims. (Cl. 123—196)

My invention relates to internal combustion engines and refers more particularly to the sleeve valve types of engines as distinguished from poppet valve engines. More specifically my invention provides improved methods and constructions relating to the Burt-McCollum type of single sleeve valve engine in which the sleeve is given a combined axial reciprocation and oscillation in accomplishing the porting and other cycles of the engine performance, but I desire it understood that my improvements are for the most part equally adaptable to other types of engines than the single sleeve type as will be more apparent from my disclosure. The teachings of my invention may also be utilized in connection with elements other than sleeves, adapted for reciprocation in cylindrical structures.

In general my invention relates to improvements in lubrication and oil consumption control for sleeve valves or other elements aforesaid. Lubricating oil tends to work excessively past the rapidly moving sleeve valve resulting in engine smoking, carbon formation, and excessive oil consumption.

I have illustrated my invention as an additional improvement for a sleeve valve of the general type described and claimed in the co-pending applications of Andre J. Meyer, Ser. No. 550,064 filed July 11, 1931, Ser. No. 556,927 filed October 5, 1931 and Ser. No. 591,251 filed February 6, 1932, assigned to the assignee corporation herein. In said co-pending applications the sleeve valve is provided with longitudinally spaced cylinder bearing lands, which I have illustrated in connection with my invention although such features of said co-pending applications may be omitted if desired since my invention is not necessarily limited to such combinations.

It is an object of my invention to control oil consumption in an improved manner and with improved results in connection with cylindrical elements moving in engine cylinders. A sleeve valve is one example of a cylindrical element and my invention is illustrated in connection with a sleeve valve of the aforesaid type.

I have provided a sleeve preferably having, in the vicinity of the inner end thereof, a zone of clearance with the engine cylinder within which said sleeve operates, said sleeve having one or more oil escape holes through the wall thereof in the region of said clearance zone whereby some of the lubricating oil accumulating in said clearance zone drains through said holes back to the oil sump before it has an opportunity to work outwardly of the sleeve in excessive amount. I have found that such oil drain holes function beneficially in connection with a clearance zone of such clearance that the oil film is broken down in such zone (as described and claimed in said application, Ser. No. 591,251), whereby the oil in the zone is moved with a ramming effect under its inertia longitudinally of the sleeve within the limits of said zone when the sleeve is reciprocated. Thus by locating such holes at or adjacent to the boundary of such zone the maximum oil escape is realized and by spacing the hole or holes from the boundary of said clearance zone the oil escape is reduced. Where the oil film is not deliberately broken down in the oil control clearance zone, the drain holes should be increased in size or number to realize the greatest benefits of my oil control.

It should be understood that the oil control and relief at the clearance zone is adapted to prevent travel of oil in excessive amount outwardly of the sleeve, but still permits sufficient oil travel to provide the desired lubrication for the outer parts of the sleeve.

Further advantages of my invention will be apparent as this specification progresses, reference being made for illustration, to the accompanying drawing showing one embodiment of my invention, and in which:

Fig. 1 is a sectional elevation view of a typical engine cylinder for a representative sleeve valve engine, Fig. 2 is an elevation view of the sleeve valve illustrating my invention, Fig. 3 is a sectional view of the sleeve along the line 3—3 of Fig. 2, Fig. 4 is an enlarged detail view of the inner cylinder end and associated sleeve valve portion with the sleeve in its lowermost position, and Fig. 5 is a detail view of a modified sleeve structure wherein the oil drain holes are spaced from the boundary of the clearance zone.

In the drawing reference character A represents an engine and for purposes of illustration this engine is shown as the Burt-McCollum type as aforesaid, the sleeve valve B moving in cylinder 10 to cause intake ports 11 and exhaust ports 12 thereof to perform the usual valving functions with cylinder intake and exhaust ports 13 and 14 respectively. Intake and exhaust manifolds 16, 17 respectively communicate with the cylinder ports 13, 14. The cylinder is closed by the usual cylinder head assembly C of the re-entrant type providing the combustion chamber 18. The sleeve is moved by a suitable driving mechanism D illustrated as a wobble crank 19 carried by the valveshaft 20 driven at half engine crankshaft speed for the usual four stroke cycle, the wobble crank 19 being connected to the sleeve by the sleeve link 21. Within the sleeve B is located the usual piston 22 operating crankshaft 23 by the connecting rod 24. The inner end or bottom of cylinder 10 is open to the crankcase 23ª adapted to contain the usual supply of lubricating oil. The lower end of sleeve B extends into the crankcase. Oil vapors and oily mist accumulate on the sleeve and cylinder and the oil tends to work upwardly of the sleeve and cylinder.

Referring particularly to Fig. 2 it will be noted that the sleeve B has a band 25 forming a bearing portion and extending circumferentially around the sleeve preferably containing the sleeve intake and exhaust ports 11, 12, this band extending axially of the sleeve sufficiently beyond the ports to provide sufficient gas seal therefor, as for example ½ of an inch below the ports in the illustration. The sleeve is provided with another bearing portion 26 spaced axially below the bearing portion 25, said portions 25 and 26 being generally referred to as upper and lower or outer and inner cylinder bearing portions. Preferably this lower bearing portion is of less longitudinal width than the upper bearing portion and is arranged preferably for operation in the vicinity of the lower or inner portion of the engine cylinder while the upper bearing portion is arranged for operation preferably in the vicinity of the cylinder ports and in the sleeve pocket 27 above the ports formed by the reentrant portion 28 of the cylinder head C. A third bearing portion 29 is located between the upper and lower bearing portions, this intermediate upper or intermediate outer bearing portion being spaced axially from the upper and lower bearing portions and preferably arranged so as to lie just below the cylinder ports when the sleeve is in its uppermost position of travel. Preferably the bearing portion 29 is spaced from the bearing portion 25 a distance substantially the same or slightly less than the vertical travel of the sleeve so as to only slightly overlap that portion of the cylinder engaged by the bearing portion 25. There is also provided a fourth bearing portion 29ª spaced axially between the bearing portions 26 and 29, this bearing 29ª being referred to as the intermediate lower or intermediate inner bearing. The sleeve portions intermediate the axially spaced bearing portions are of less diameter than the bearing portions to provide clearance between the sleeve and cylinder such as cylinder clearance portions or zones 30, 31 and 31ª. The clearance 31ª may be greater than the clearances 30 and 31 as described in said application, Serial No. 591,251.

As an illustration of typical sleeve and cylinder fits which I have found adaptable for accomplishing the objects of my invention, I may fit zones 25, 26, 29 and 29ª within cylinder 10 with .002 of an inch clearance and even less, the remaining portions of the sleeve preferably being free from contact with the cylinder. In this manner much of the friction losses of the engine may be eliminated to produce useful delivered horsepower output. It will be observed that in Fig. 1 with the crankshaft moving clockwise as indicated by the arrow the expansion or combustion cycle is approximately just commencing and the intake gases being compressed for firing. The piston 22 is approximately located at or near top or outer dead center and the band or zone 25 is projected upwardly in the sleeve pocket whereby the sleeve portion 30 will be positioned opposite the cylinder ports 13, 14. Thus, the peak pressures developed by the combustion in chamber 18 act outwardly within the sleeve at portions thereof having sufficient clearance with the cylinder to prevent friction losses between the sleeve and cylinder during explosion. Furthermore, by reason of the bearing sleeve zones 25, 26, 29 and 29ª being a relatively small proportion of the total sleeve area the friction loss due to sleeve movement is greatly reduced and the sleeve bearing provided where it will act most efficiently. Unusually close fits between the cylinder and sleeve at the sleeve ports may be provided in order to realize an efficient gas seal with improved power output and greatly reduced oil pumping and carbonization in the combustion chamber.

By way of illustration I have formed zones 25, 29, 29ª, and 26 with .0005 of an inch clearance indicated at X with the cylinder, where the cylinder bore is about 3.5 inches in diameter, and approximately .002 of an inch clearance indicated at Y for the zones 30 and 31. The clearance for the latter zones should not exceed approximately .002 of an inch since substantially this amount is necessary to maintain a film of oil of ordinary quality between the cylinder and the walls of zones 30 and 31. The zone 31ª is provided with a clearance indicated at Z preferably greater than clearance Y my approximately .001 of an inch and exaggerated in Fig. 4 for clarity. Thus the outside diameter of zone 31ª is approximately .002 of an inch less than the outside diameter of zones 30 and 31. This will maintain an adequate film of oil of ordinary quality between the cylinder and the walls of zones 30 and 31 for adequate lubrication and heat transfer to the cylinder. The zone 31ª of smaller clearance or less diameter than zones 30 and 31 has its oil film broken down but at the same time will deliver an adequate quantity of oil to maintain the oil film for zones 30 and 31.

In addition to controlling the oil consumption of the sleeve and its passage outwardly of the sleeve by reason of deliberate breaking down of the oil film in the oil control clearance zone or annulus 31ª, my invention in part resides in removing oil from zone 31ª by the provision of one or more oil relief holes 32 whose number and size will depend first on the requirements for oil control and the extent to which oil consumption is desired to be controlled, and second, on the location of such holes with respect to the boundary edges or lands 33 or 34 of zone 31ª.

As the sleeve reciprocates in the cylinder the mass of oil in zone 31ª is thrown or moved outwardly of zone 31ª toward land 34 when the sleeve moves inwardly and toward land 33 when the sleeve moves outwardly. Thus by locating holes 32 at or adjacent to one of the lands as the land 33, they are very effective in permitting oil travel therethrough as the oil is thrown downwardly or inwardly toward land 33. In Fig. 5 the holes 32ª are shown adjacent to, but spaced somewhat outwardly from, the land 33, in which location they are somewhat less effective in permitting oil escape from zone Z to the crankcase sump 23ª.

With a sleeve constructed as shown in Fig. 2 I have obtained exceptionally good oil economy, even with relatively thin oil, at the same time maintaining good lubrication for the sleeve and engine parts.

Instead of breaking down the oil film in zone 31ª, such zone of oil control may be provided with an adequate number and size of oil drain holes to carry off the desired amount of oil from this clearance zone and my invention is not limited to the specific arrangement of zones and oil holes as illustrated. However, by breaking down the oil film at the control zone 31ª, the oil holes 32 are not called upon to drain as much oil as they would in the event the zone 31ª had its clearance less than enough to break down the oil film, such as the clearance Y for example.

I have thus provided an oil consumption control at the lower or inner portion of cylinder whereby oil travel upwardly or outwardly is materially reduced and still ample lubrication maintained.

It will be apparent to those skilled in the art to which my invention pertains that various modifications and changes may be made therein without departing from the spirit of my invention or from the scope of the appended claims.

What I claim as my invention is:

1. In an engine, a tubular sleeve valve adapted for movement in a cylinder of the engine, said sleeve having an oil controlling zone of clearance with the cylinder, said sleeve having an oil relief hole through the wall thereof communicating with said clearance zone whereby to pass a portion of said oil from said clearance zone.

2. In an engine, a tubular sleeve valve adapted for movement in a cylinder of the engine, said sleeve having an oil controlling zone of clearance with the cylinder, said sleeve having an oil relief hole through the wall thereof communicating with said clearance zone, said oil relief hole being located adjacent one end of said zone axially of said sleeve whereby to pass a portion of said oil from said clearance zone.

3. In an engine, a tubular sleeve valve adapted for movement in a cylinder of the engine, said sleeve having an oil controlling zone of clearance with the cylinder, said sleeve having an oil relief hole through the wall thereof communicating with said clearance zone, said zone having a clearance with said cylinder sufficient to break down the oil film between the cylinder and sleeve at said zone, a portion of said body of oil in said zone being removed through said oil relief hole during engine operation.

4. In an engine, a tubular sleeve valve adapted for movement in a cylinder of the engine, said sleeve having an oil controlling zone of clearance with the cylinder, said sleeve having an oil relief hole through the wall thereof communicating with said clearance zone, said oil relief hole being located adjacent one end of said zone axially of said sleeve, said zone having a clearance with said cylinder sufficient to break down the oil film between the cylinder and sleeve at said zone, a portion of said body of oil in said zone being removed through said oil relief hole during engine operation.

5. In an engine, a tubular sleeve valve adapted for movement in a cylinder of the engine, said sleeve having an oil controlling zone of clearance with the cylinder, said sleeve having a plurality of oil relief holes spaced circumferentially about said clearance zone and extending through the wall of the sleeve for removing a portion of the oil from said oil controlling clearance zone during engine operation.

6. In an engine, an element having a cylindrical portion thereof adapted for sliding movement in a cylinder of the engine, said element having a pair of longitudinally spaced cylinder bearing portions with an intermediate zone of cylinder clearance, said element having an oil relief hole through its wall at said clearance zone, said hole being adapted to remove a portion of the body of oil from said zone during engine operation.

7. In an engine, an element having a cylindrical portion thereof adapted for reciprocating movement in a cylinder of the engine, said element having a pair of longitudinally spaced cylinder bearing portions with an intermediate zone of cylinder clearance, said element having an oil relief hole through its wall at said clearance zone, said zone having a clearance with said cylinder sufficient to break down the oil film between the cylinder and element at said zone, said hole being adapted to periodically remove a portion of the body of oil from said zone during engine operation.

8. In an engine, a tubular sleeve valve adapted for movement in a cylinder of the engine, said sleeve having an oil controlling zone of clearance with the cylinder, said sleeve having an oil relief hole through the wall thereof communicating with said clearance zone, said clearance zone being positioned for movement adjacent the inner end of said cylinder, said oil relief hole being adapted to remove a portion of the body of oil from said zone during engine operation.

9. In an engine, a tubular sleeve valve adapted for movement in a cylinder of the engine, said sleeve having a plurality of longitudinally spaced cylinder bearing portions with intermediate clearance portions of less diameter than that of said bearing portions, one of said clearance portions having a diameter less than another whereby to regulate oil travel thereto, said sleeve being provided with an oil relief hole through its wall at said clearance portion of less diameter.

10. In an engine, a tubular sleeve valve adapted for movement in a cylinder of the engine, said sleeve having a plurality of longitudinally spaced cylinder bearing portions with intermediate clearance portions of less diameter than that of said bearing portions, one of said clearance portions having a diameter less than another whereby to regulate oil travel thereto, said first clearance portion being located outwardly of said sleeve, and the last said clearance portion being located for movement in the vicinity of the inner end of the cylinder, the last said clearance portion having one or more oil relief holes through the wall thereof.

11. In an engine, a tubular sleeve valve adapted for axial movement in a cylinder of the engine, cylinder bearing bands spaced axially of the sleeve, annular cylinder clearance portions intermediate said bands, one of said clearance portions having a relatively greater clearance with the cylinder and being provided with an oil drain hole through the wall thereof for removing a portion of the body of oil in said clearance portion during engine operation.

12. In an engine, a tubular sleeve valve adapted for axial movement in a cylinder of the engine, cylinder bearing bands spaced axially of the sleeve, annular cylinder clearance portions intermediate said bands, one of said clearance portions being located for movement adjacent the inner end of said cylinder, said last clearance portion having a relatively great clearance with the cylinder whereby to control oil passage outwardly of the cylinder, said sleeve having an oil drain hole through its wall communicating with the last said clearance portion.

13. In an engine, a cylinder, a sleeve valve operably associated with the cylinder, said sleeve having an oil film forming recess, and means including an oil drain hole spaced inwardly of said recess for removing a portion of the oil intermediate said sleeve and cylinder whereby to control the oil supply to said recess.

14. In an engine, a cylinder having an annular row of ports in its wall, a sleeve valve operably associated therewith and having ports adapted for cooperation with the cylinder ports, said sleeve having an oil film clearance zone with the cylinder adjacent and below said sleeve ports, said oil film clearance zone adapted to maintain an oil film with said cylinder, said sleeve having an oil controlling clearance zone spaced below said oil film clearance zone adapted to maintain an relief hole at the last said clearance zone.

15. In an engine, a cylinder having an annular row of ports in its wall, a sleeve valve operably associated therewith and having ports adapted for cooperation with the cylinder ports, said sleeve having an oil film clearance zone with the cylinder adjacent and below said sleeve ports, said oil film clearance zone adapted to maintain an oil film with said cylinder, said sleeve having an oil controlling clearance zone and one or more drain holes in its wall spaced below said oil film clearance zone and communicating with said oil controlling clearance zone, and means for moving said sleeve valve with combined axial reciprocation and oscillation in said cylinder to move a body of oil longitudinally in opposite directions in the last said clearance zone whereby to force a portion of said body of oil through said drain hole or holes.

16. In an engine, a cylinder having an annular row of ports in its wall, a sleeve valve operably associated therewith and having a reciprocating movement, said sleeve valve having ports adapted for cooperation with the cylinder ports, said sleeve having an oil film clearance zone with the cylinder adjacent and below said sleeve ports, said oil film clearance zone adapted to maintain an oil film with said cylinder, said sleeve having an oil controlling clearance zone spaced below said oil film clearance zone, said oil controlling clearance zone being located for movement in the vicinity of the bottom of said cylinder and beng provided with one or more oil drain holes through its wall, the body of oil moved longitudinally in opposite directions in said oil controlling clearance zone by the reciprocation of the sleeve whereby to force a portion of said body of oil through said drain hole or holes.

17. In an engine, a cylinder having an annular row of ports in its wall, a sleeve valve operably associated therewith and having a reciprocating movement, said sleeve valve having ports adapted for cooperation with the cylinder ports, said sleeve having an oil film clearance zone with the cylinder adjacent and below said sleeve ports, said oil film clearance zone adapted to maintain an oil film with said cylinder, said sleeve having an oil controlling clearance zone spaced below said oil film clearance zone, said oil controlling clearance zone having a relatively great clearance with the cylinder sufficient to substantially break down the oil film tending to form therein, said oil controlling clearance zone portion of said sleeve being provided with one or more oil drain holes through its wall, the body of oil moved longitudinally in opposite directions in said oil controlling clearance zone by the reciprocaton of the sleeve whereby to force a portion of said body of oil through said hole or holes.

18. A sleeve valve of the combined movement type of the character described, said sleeve adapted for movement in a cylinder and having a first cylinder bearing zone outwardly thereof, said bearing zone having a plurality of ports, a second cylinder bearing zone spaced below said first zone to provide an oil film forming cylinder clearance portion therebetween, third and fourth cylinder bearing zones spaced below said second zone, said third and fourth zones being axially spaced to provide a cylinder clearance portion having a clearance with the cylinder sufficient to substantially break down the oil film tending to form therein, and means associated with said last cylinder clearance portion for draining oil accumulations therefrom.

19. A sleeve valve of the combined movement type of the character described, said sleeve adapted for movement in a cylinder and having a first cylinder bearing zone outwardly thereof, said bearing zone having a plurality of ports, a second cylinder bearing zone spaced below said first zone to provide an oil film forming cylinder clearance portion therebetween, third and fourth cylinder bearing zones spaced below said second zone, said third and fourth zones being axially spaced to provide a cylinder clearance portion having a clearance with the cylinder sufficient to break down the oil film tending to form therein, and means associated with said last cylinder clearance portion for periodically draining oil therefrom.

20. A sleeve valve of the combined movement type of the character described, said sleeve adapted for movement in a cylinder and having a first cylinder bearing zone outwardly thereof, said bearing zone having a plurality of ports, a second cylinder bearing zone spaced below said first zone to provide an oil film forming cylinder clearance zone therebetween, third and fourth cylinder bearing zones spaced below said second zone, said third and fourth zones being axially spaced to provide an oil controlling clearance zone having a clearance with the cylinder sufficient to break down the oil film tending to form therein, said sleeve having one or more oil drain holes through its wall intermediate said third and fourth bearing zones, said sleeve having a second oil film forming cylinder clearance zone intermediate said second and third cylinder bearing zones, the body of oil moved longitudinally in opposite directions in said oil controlling clearance zone by the recprocation of the sleeve whereby to force a portion of said body of oil through said hole or holes.

21. In an engine of the sleeve valve type, a cylinder, a sleeve valve operatively associated with said cylinder and having a reciprocating movement, said sleeve having an oil controlling groove opening to said cylinder and having a clearance therewith sufficient to substantially break down the oil film tending to form therein, said sleeve having an opening through the wall thereof communicating with the body of lubricant moved longitudinally in opposite directions in said groove by the reciprocation of the sleeve whereby to force a portion of said body of lubricant through said opening.

22. In an engine, a cylinder, a substantially cylindrical member reciprocating in said cylinder, said member being subjected to a supply of oil tending to move axially of said member, said member having an oil controlling groove having a clearance with said cylinder sufficient to substantially break down the oil film tending to form between said member and said cylinder whereby a body of oil is reciprocated in said groove by the aforesaid movement of said member, and means responsive to the reciprocation of said body of oil for forcibly removing a portion of said oil in said groove.

23. In an engine, a cylinder, a substantially cylindrical member reciprocating in said cylinder, said member being subjected to a supply of oil tending to move axially of said member, said member having an oil controlling groove having a clearance with said cylinder sufficient to substantially break down the oil film tending to form between said member and said cylinder whereby a body of oil is reciprocated in said groove by the aforesaid movement of said member, and means responsive to the reciprocation of said body of oil for periodically forcibly removing a portion of said oil in said groove.

24. In an engine of the sleeve valve type, a cylinder, a sleeve valve operatively associated with said cylinder and having a reciprocating movement, said sleeve having an oil controlling groove opening to said cylinder and having a clearance therewith sufficient to substantially break down the oil film tending to form therein, said sleeve having an opening adjacent an axial boundary of said groove and extending through the wall thereof communicating with the body of lubricant moved longitudinally in opposite directions in said groove by the reciprocation of the sleeve whereby to force a portion of said body of lubricant through said opening.

25. In an engine of the sleeve valve type, a cylinder, a sleeve valve operatively associated with said cylinder and having a combined oscillating and reciprocating movement with respect to the cylinder and sleeve axes, said sleeve having an oil controlling groove opening to said cylinder and having a clearance therewith sufficient to substantially break down the oil film tending to form therein, said sleeve having an opening through the wall thereof communicating with the body of lubricant moved longitudinally in opposite directions in said groove by the reciprocation of the sleeve whereby to force a portion of said body of lubricant through said opening.

26. In an engine of the sleeve valve type, a cylinder, a sleeve valve operatively associated with said cylinder and having a reciprocating movement, said sleeve having an oil controlling groove opening to said cylinder and having a clearance therewith sufficient to substantially break down the oil film tending to form therein, said sleeve having a plurality of openings through the wall thereof communicating with the body of lubricant moved longitudinally in opposite directions in said groove by the reciprocation of the sleeve whereby to force a portion of said body of lubricant through said openings.

27. In an engine of the sleeve valve type having a crankcase, a cylinder, a sleeve valve operatively associated with said cylinder and having a reciprocating movement, said sleeve having an oil controlling groove opening to said cylinder and having a clearance therewith sufficient to substantially break down the oil film tending to form therein, said groove operating substantially adjacent the inner end of the cylinder and said crankcase, said sleeve having an opening through the wall thereof communicating with the body of lubricant moved longitudinally in opposite directions in said groove by the reciprocation of the sleeve whereby to force a portion of said body of lubricant through said opening for return to said crankcase.

28. In an engine, a pair of relatively reciprocating members, one bearing within the other, one of said members having an oil controlling groove opening to said other member and having a clearance therewith sufficient to substantially break down an oil film tending to form therein, the first said member having an opening through the wall thereof communicating with the body of lubricant moved longitudinally in opposite directions in said groove by the relative reciprocation of said members whereby to force a portion of said body of lubricant through said opening.

29. In an engine, a pair of relatively reciprocating members, one bearing within the other, one of said members having an oil controlling groove opening to said other member and having a clearance therewith sufficient to substantially break down an oil film tending to form therein, the first said member provided with bearing zones adjacent the axial boundaries of said groove and having an opening through the wall thereof communicating with the body of lubricant moved longitudinally in opposite directions in said groove by the relative reciprocation of said members whereby to force a portion of said body of lubricant through said opening.

30. In an engine, a pair of relatively reciprocating members, one bearing within the other, one of said members having an oil controlling groove opening to said other member and having a clearance therewith sufficient to substantially break down an oil film tending to form therein whereby a body of oil is reciprocated in said groove by the aforesaid relatively reciprocating movement of said members, and means responsive to the reciprocation of said body of oil for forcibly removing a portion of said oil in said groove.

LEWIS P. KALB.